(12) United States Patent
Hong et al.

(10) Patent No.: US 11,899,977 B2
(45) Date of Patent: Feb. 13, 2024

(54) METHOD AND APPARATUS FOR PERFORMING ACCESS MANAGEMENT OF MEMORY DEVICE WITH AID OF SERIAL NUMBER ASSIGNMENT TIMING CONTROL

(71) Applicant: Silicon Motion, Inc., Hsinchu County (TW)

(72) Inventors: Wen-Chi Hong, Taichung (TW); Hsin-Hsiang Tseng, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/691,137

(22) Filed: Mar. 10, 2022

(65) Prior Publication Data
US 2023/0289097 A1 Sep. 14, 2023

(51) Int. Cl.
*G06F 3/06* (2006.01)

(52) U.S. Cl.
CPC ............ *G06F 3/0659* (2013.01); *G06F 3/064* (2013.01); *G06F 3/0611* (2013.01); *G06F 3/0652* (2013.01); *G06F 3/0679* (2013.01); *G06F 2212/7205* (2013.01); *G06F 2212/7209* (2013.01)

(58) Field of Classification Search
CPC ...... G06F 3/0659; G06F 3/0611; G06F 3/064; G06F 3/0652; G06F 3/0679; G06F 2212/7205; G06F 2212/7209
See application file for complete search history.

(56) References Cited

U.S. PATENT DOCUMENTS

| 9,830,098 B1 * | 11/2017 | Lin ........................ G11C 16/10 |
| 2011/0055458 A1 | 3/2011 | Kuehne | |
| 2018/0373433 A1 * | 12/2018 | Ke ...................... G06F 12/0292 |

FOREIGN PATENT DOCUMENTS

| JP | 2017-162067 | 9/2017 |
| TW | 201835922 A | 10/2018 |
| TW | 201915746 A | 4/2019 |

* cited by examiner

Primary Examiner — Kalpit Parikh
(74) Attorney, Agent, or Firm — Winston Hsu

(57) ABSTRACT

A method for performing access management of a memory device with aid of serial number assignment timing control and associated apparatus are provided. The method includes: managing a plurality of spare blocks with a spare pool; popping a first block from the spare pool to be a host data block, and performing first subsequent operations, wherein the host data block is arranged to receive data from a host device, and serial number assignment of the host data block corresponds to a timing of fully programing the host data block; and popping a second block from the spare pool to be a garbage collection (GC) destination block, and performing second subsequent operations, wherein the GC destination block is arranged to receive data from a GC source block during a GC procedure, and serial number assignment of the GC destination block corresponds to a timing of starting using the GC destination block.

10 Claims, 9 Drawing Sheets

METHOD AND APPARATUS FOR PERFORMING ACCESS MANAGEMENT OF MEMORY DEVICE WITH AID OF SERIAL NUMBER ASSIGNMENT TIMING CONTROL

BACKGROUND OF THE INVENTION

1. Field of the Invention

The present invention is related to memory control, and more particularly, to a method for performing access management of a memory device with aid of serial number assignment timing control, and associated apparatus such as the memory device, a memory controller thereof, etc.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g., 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, a garbage collection (GC) operation may be performed in order to solve an existing problem of the related art, where programing addition finish pages on a destination block of the GC operation may impact the quality of service (QoS) too much, and the QoS issue may become much more severe for an enterprise product. In addition, when a sudden power off (SPO) event occurs during the GC operation and it is needed to perform a sudden power off recovery (SPOR), the above management mechanisms may be unable to handle a special case regarding a source block of the GC operation. As a result, an erroneous operation may occur during the SPOR.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing access management of a memory device with aid of serial number assignment timing control, and to provide associated apparatus such as the memory device, a memory controller thereof, etc., to solve the problems mentioned above.

At least one embodiment of the present invention provides a method for performing access management of a memory device with aid of serial number assignment timing control, wherein the method is applied to a controller of the memory device. The memory device may comprise the controller and a non-volatile (NV) memory, and the NV memory may comprise at least one NV memory element (e.g., one or more NV memory elements), where the at least one NV memory element may comprise a plurality of blocks. The method may comprise: managing a plurality of spare blocks with a spare pool, wherein the plurality of blocks comprise the plurality of spare blocks; popping a first block from the spare pool to be a host data block, and performing a set of first subsequent operations on the host data block, wherein the host data block is arranged to receive data from a host device, and regarding the set of first subsequent operations, serial number assignment of the host data block corresponds to a timing of fully programing the host data block since the first block is popped from the spare pool to be the host data block, for indicating a rank of the host data block among a plurality of data blocks for further use in sudden power off recovery (SPOR), wherein the plurality of blocks comprise the plurality of data blocks; and popping a second block from the spare pool to be a garbage collection (GC) destination block, and performing a set of second subsequent operations on the GC destination block, wherein the GC destination block is arranged to receive data from a GC source block during a GC procedure, and regarding the set of second subsequent operations, serial number assignment of the GC destination block corresponds to a timing of starting using the GC destination block since the second block is popped from the spare pool to be the GC destination block, for indicating a rank of the GC destination block among the plurality of data blocks for further use in the SPOR.

In addition to the method mentioned above, the present invention also provides a memory device, and the memory device comprises an NV memory and a controller. The NV memory is configured to store information, wherein the NV memory may comprise at least one NV memory element (e.g., one or more NV memory elements), and the at least one NV memory element may comprise a plurality of blocks. The controller is coupled to the NV memory, and the controller is configured to control operations of the memory device. In addition, the controller comprises a processing circuit, wherein the processing circuit is configured to control the controller according to a plurality of host commands from a host device, to allow the host device to access the NV memory through the controller. For example, the controller manages a plurality of spare blocks with a spare pool, wherein the plurality of blocks comprise the plurality of spare blocks; the controller pops a first block from the spare pool to be a host data block, and performs a set of first subsequent operations on the host data block, wherein the host data block is arranged to receive data from the host device, and regarding the set of first subsequent operations, serial number assignment of the host data block corresponds to a timing of fully programing the host data block since the first block is popped from the spare pool to be the host data block, for indicating a rank of the host data block among a plurality of data blocks for further use in SPOR, wherein the plurality of blocks comprise the plurality of data blocks; and the controller pops a second block from the spare pool to be a GC destination block, and performs a set of second subsequent operations on the GC destination block, wherein the GC destination block is arranged to receive data from a GC source block during a GC procedure, and regarding the set of second subsequent operations, serial number assignment of the GC destination block corresponds to a timing of starting using the GC destination block since the second block is popped from the spare pool to be the GC destination block, for indicating a rank of the GC destination block among the plurality of data blocks for further use in the SPOR.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the method mentioned above, the present invention also provides a controller of a memory device, wherein the memory device comprises the controller and an NV memory. The NV memory may comprise at least one NV memory element (e.g., one or more NV memory elements), and the at least one NV memory element may comprise a plurality of blocks. In addition, the controller comprises a processing circuit, wherein the processing circuit is configured to control the controller according to a plurality of host commands from a host device, to allow the host device to access the NV memory through the controller. For example, the controller manages a plurality of spare blocks with a spare pool, wherein the plurality of blocks comprise the plurality of spare blocks; the controller pops a first block from the spare pool to be a host data block, and performs a set of first subsequent operations on the host data block, wherein the host data block is arranged to receive data from the host device, and regarding the set of first subsequent operations, serial number assignment of the host data block corresponds to a timing of fully programing the host data block since the first block is popped from the spare pool to be the host data block, for indicating a rank of the host data block among a plurality of data blocks for further use in SPOR, wherein the plurality of blocks comprise the plurality of data blocks; and the controller pops a second block from the spare pool to be a GC destination block, and performs a set of second subsequent operations on the GC destination block, wherein the GC destination block is arranged to receive data from a GC source block during a GC procedure, and regarding the set of second subsequent operations, serial number assignment of the GC destination block corresponds to a timing of starting using the GC destination block since the second block is popped from the spare pool to be the GC destination block, for indicating a rank of the GC destination block among the plurality of data blocks for further use in the SPOR.

The method and the associated apparatus provided by the present invention can ensure that the memory device can properly operate under various situations, where examples of the apparatus mentioned above comprise: the controller, the memory device, etc. For example, with aid of the serial number assignment timing control, the method and the associated apparatus provided by the present invention can correctly perform the SPOR. In addition, the method and the associated apparatus provided by the present invention can ensure real-time response from the memory device to the host device, and therefore can improve the overall performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
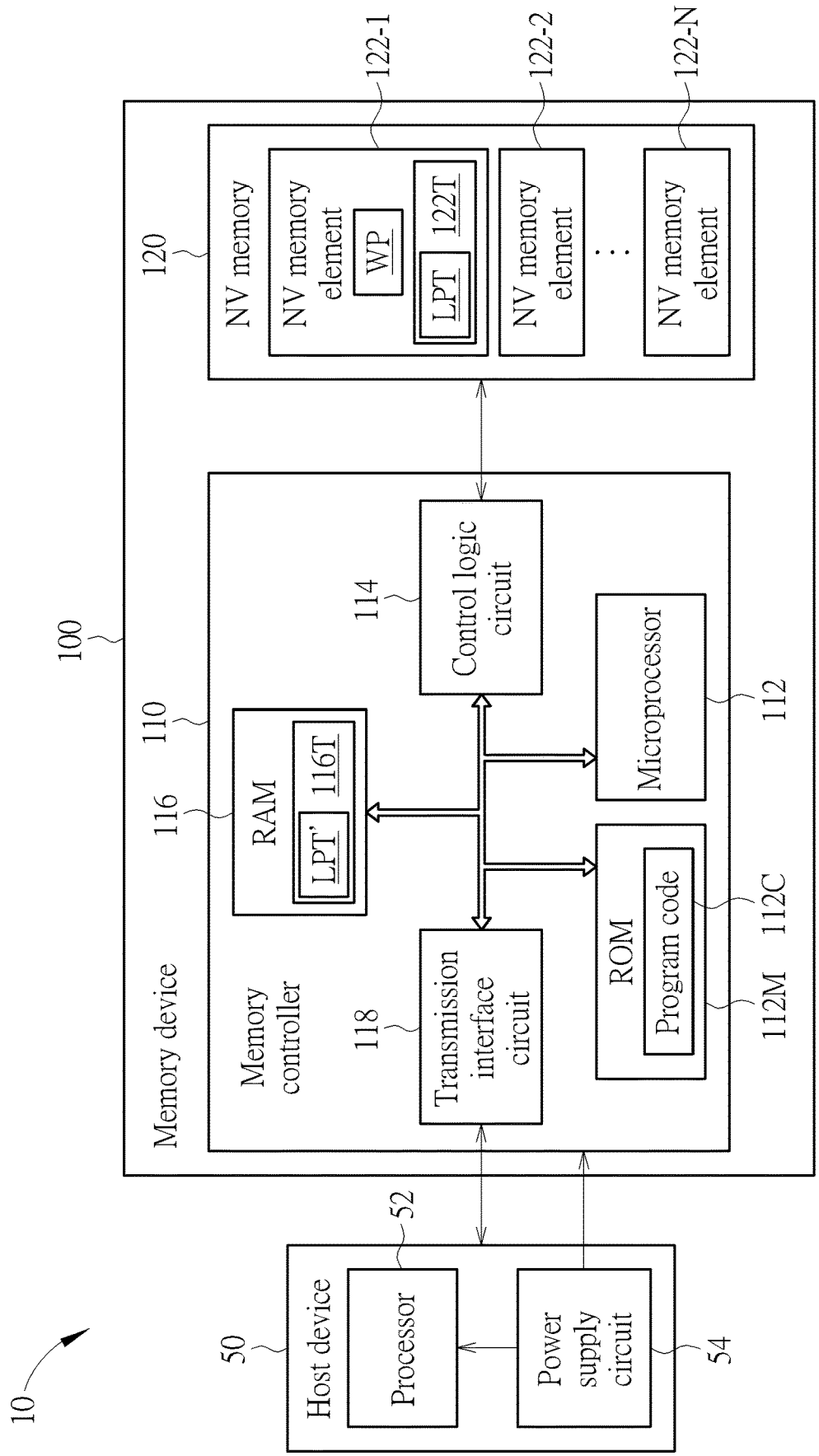
FIG. 1 is a diagram of an electronic device according to an embodiment of the present invention.

FIG. 1 is a diagram of an electronic device 10 according to an embodiment of the present invention, wherein the electronic device 10 may comprise a host device 50 and a memory device 100. The host device 50 may comprise at least one processor (e.g., one or more processors), which may be collectively referred to as a processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to be used as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g., memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, wherein the controller is arranged to control operations of the memory device 100 and access the NV memory 120, and the NV memory 120 is arranged to store information. The NV memory 120 may comprise at least one NV memory element (e.g., one or more NV memory elements), such as a plurality of NV memory elements 122-1, 122-2, . . . and 122-N, wherein the symbol "N" can represent a positive integer greater than one. For example, the NV memory 120 may be a flash memory, and the plurality of NV memory elements 122-1, 122-2, . . . and 122-N may be a plurality of flash memory chips or a plurality of flash memory dies, but the invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, wherein the above elements can be coupled to each other through a bus. The RAM 116 is implemented by a static random access memory (SRAM), but the invention is not limited thereto. The RAM 116 can be arranged to provide the memory controller 110 with internal storage space. For example, the RAM 116 can be used as a buffer memory to buffer data. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory. In addition, a data protection circuit (not shown) in the control logic circuit 114 can protect data and/or perform error correction, and the transmission interface circuit 118 can conform to a specific communications specification such as Serial Advanced Technology Attachment (SATA) specification, Universal Serial Bus (USB) specification, Peripheral Component Interconnect Express (PCIe) specification, embedded Multi-Media Card (eMMC) specification, or Universal Flash Storage (UFS) specification, and can perform communications according to the specific communications specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and then controls the NV memory with the operation commands to perform reading, writing/programming, etc. on memory units (e.g., data pages) with physical addresses in the NV memory 120, wherein the physical addresses can be associated with the logical addresses. When the memory controller 110 performs an erase operation on any NV memory element 122-n among the plurality of NV memory elements 122-1, 122-2, . . . and 122-N (the symbol "n" can represent any integer in the interval [1, N]), at least one of multiple blocks of the NV memory device 122-n will be erased, wherein each block in the multiple blocks can comprise multiple pages (e.g., data pages), and an access operation (e.g., reading or writing) can be performed on one or more pages.

According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g., one of the plurality of host commands), and provide the host device 50 with the data read from the NV memory 120. In the NV memory 120 such as the flash memory, the aforementioned at least one NV memory element (e.g., the plurality of NV memory elements 122-1, 122-2, . . . and 122-N) may comprise a plurality of blocks such as a first set of physical blocks in the NV memory element 122-1, a second set of physical blocks in the NV memory element 122-2, . . . and an $N^{th}$ set of physical blocks in the NV memory element 122-N. The memory controller 110 can be designed to properly manage the plurality of blocks such as these sets of physical blocks.

For better comprehension, the plurality of blocks such as these sets of physical blocks may comprise a plurality of data blocks (e.g., a plurality of valid blocks storing valid data) and a plurality of spare blocks (e.g., a plurality of blank blocks, such as erased blocks that are ready for use). The host device 50 may send a first write request for writing data at a certain logical address, and the memory controller 110 may write the data at a first location within the NV memory 120, such as a physical address associated with this logical address. Afterward, the host device 50 may send a second write request for writing data at the same logical address, and the memory controller 110 may write the data at a second location within the NV memory 120, such as another physical address associated with this logical address, and determine that the data at the first location within the NV memory 120 becomes invalid data. In addition, the memory controller 110 can trigger a garbage collection (GC) procedure to discard invalid data in one or more data blocks among the plurality of data blocks and make valid data in the one or more data blocks be stored together somewhere else, and more particularly, select one or more spare blocks from the plurality of spare blocks to be one or more new members of the plurality of data blocks, such as one or more new data blocks, copy the valid data from the one or more data blocks into the one or more new data blocks, and erase the one or more data blocks to be one or more new members of the plurality of spare blocks, such as one or more new spare blocks, in order to prepare more storage space for further storing new data.

The memory controller 110 can record, maintain, and/or update block management information regarding the block management in at least one table such as a table 116T and a table 122T, where the table 116T may comprise a temporary version of at least a portion (e.g., a part or all) of the table 122T. For example, the table 122T may comprise at least one logical-to-physical (L2P) address mapping table (e.g., one or more L2P address mapping tables), which may be collectively referred to as the L2P table LPT, for recording mapping relationships between logical addresses and physical addresses, and the table 116T may comprise a temporary version of at least one sub-table (e.g., one or more sub-tables) of the L2P table LPT, where the temporary version of the aforementioned at least one sub-table may be collectively referred to as the L2P table LPT', but the invention is not limited thereto. For example, the memory controller 110 can further record, maintain, and/or update write protection (WPRO) information WP regarding the block management, for protecting the access management mechanisms of the memory controller 110, and more particularly, preventing the access management mechanisms of the memory controller 110 from malfunctioning (e.g., operating abnormally) due to any sudden power off (SPO) event. After the SPO event, the memory controller 110 can perform SPO recovery (SPOR) at least according to the write protection information WP.

The memory controller 110 can back up the table 116T to the table 122T in the NV memory 120 (e.g., one or more NV memory elements in the plurality of NV memory elements 122-1, 122-2, . . . and 122-N), and the memory controller 110 may load at least a portion (e.g., a part or all) of the table 122T into the RAM 116 to become the table 116T for quick reference, where the table 122T can be illustrated in a certain NV memory element such as the NV memory element 122-1 to indicate that the table 122T can be stored in the NV memory element 122-1, but the invention is not limited thereto. According to some embodiments, the table 122T can be divided into multiple portions for being stored in two or more NV memory elements among the plurality of NV memory elements 122-1, 122-2, . . . and 122-N, and the table 122T can be illustrated as the multiple portions respectively stored in the two or more NV memory elements.

Figure 2:
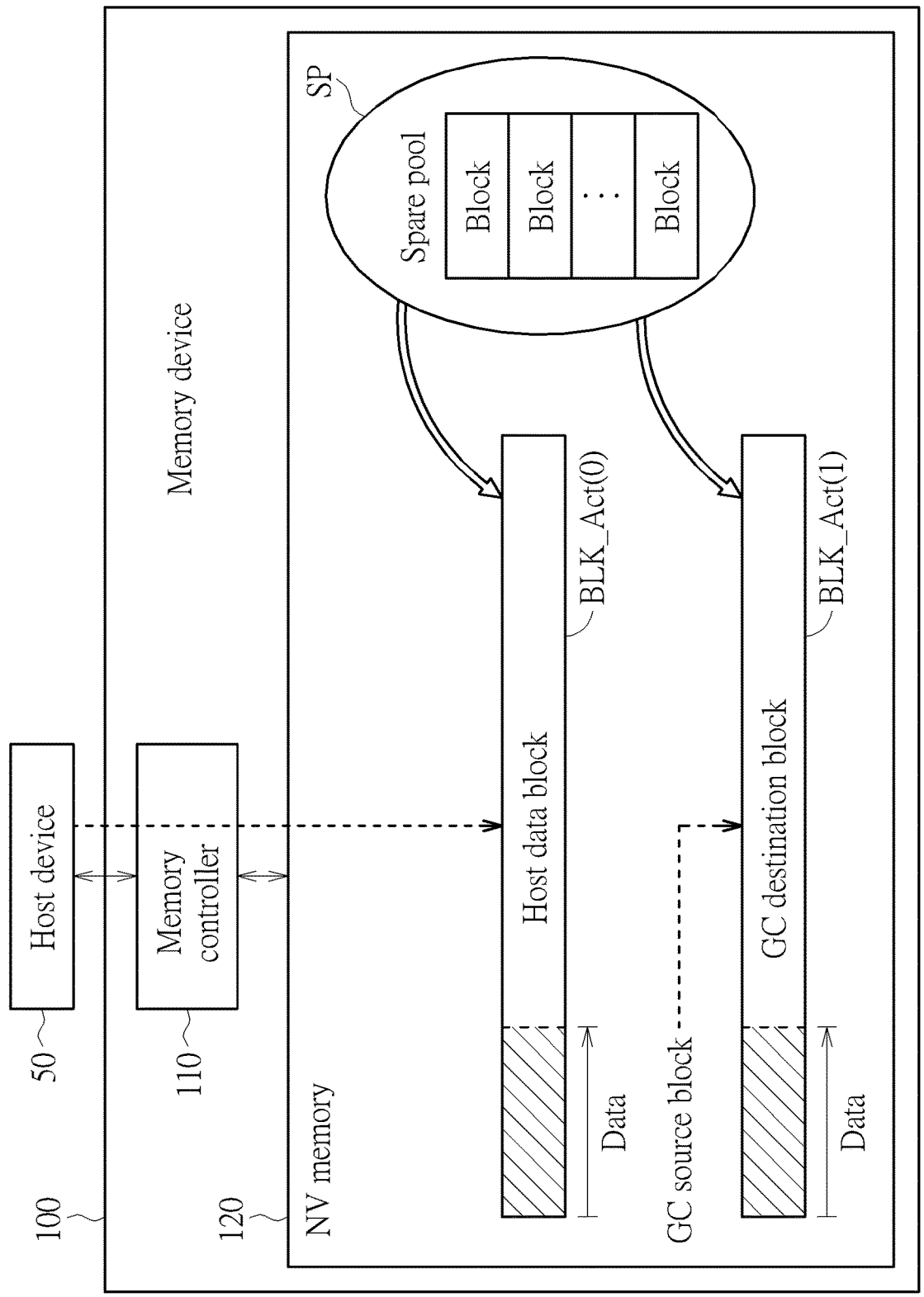
FIG. 2 is a diagram illustrating a data receiving control scheme of a method for performing access management of a memory device such as the memory device shown in FIG. 1 with aid of serial number assignment timing control according to an embodiment of the instant application.

FIG. 2 is a diagram illustrating a data receiving control scheme of a method for performing access management of a memory device such as the memory device 100 shown in FIG. 1 with aid of serial number assignment timing control according to an embodiment of the instant application. As shown in the lower half of FIG. 2, the memory device 100 that operates according to the method can be equipped with a spare pool SP, and can manage the plurality of spare blocks (labeled "Block" in FIG. 2 for brevity) with the spare pool SP, and more particularly, can pop a first block from the spare pool SP to be a host data block BLK_Act(0), and pop a second block from the spare pool SP to be a GC destination block BLK_Act(1). As illustrated with the arrows depicted with dash lines in FIG. 2, the host data block BLK_Act(0) can be arranged to receive data from the host device 50, and the GC destination block BLK_Act(1) can be arranged to receive data from a GC source block during the GC procedure. For example, in response to a write request from the host device 50, such as the first write request, the second write request, etc., the memory controller 110 may obtain data (e.g., the data to be written) from the host device 50 and write (e.g., program) the data into the host data block BLK_Act(0). For another example, during the GC procedure, the memory controller 110 may read data (e.g., the valid data) from the GC source block such as any of the one or more data blocks and write (e.g., program) the data into the GC destination block BLK_Act(1).

The memory device 100 that operates according to the method can perform the GC procedure efficiently, where programing addition finish pages on the GC destination block BLK_Act(1) of the GC procedure will not impact the quality of service (QoS) too much, and the memory device 100 that operates according to the method can improve the QoS, especially for the case that the memory device 100 is implemented as an enterprise product. In addition, when the SPO event occurs during the GC procedure and it is needed to perform the SPOR, the memory device 100 that operates according to the method can properly perform the SPOR in any of various situations. As a result, no erroneous operation will occur during the SPOR.

Figure 3:
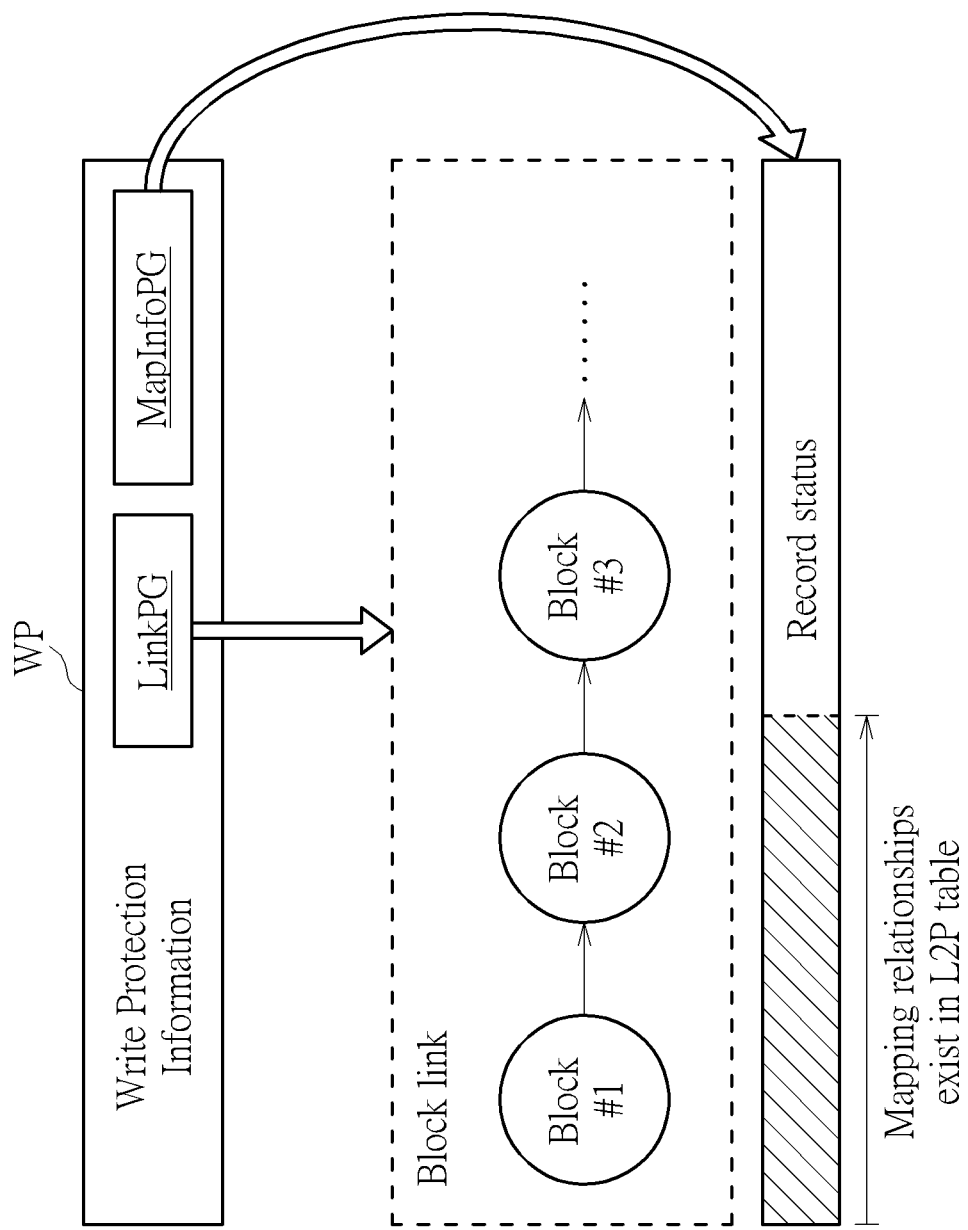
FIG. 3 is a diagram illustrating a block link control scheme of the method according to an embodiment of the instant application.

FIG. 3 is a diagram illustrating a block link control scheme of the method according to an embodiment of the instant application. As shown in the uppermost part of FIG. 3, the write protection information WP may comprise at least one link page (e.g., one or more link pages), which may be collectively referred to as the link page LinkPG, and at least one L2P-mapping-existence information page (e.g., one or more L2P-mapping-existence information pages), which may be collectively referred to as the L2P-mapping-existence information page MapInfoPG.

The memory controller 110 can manage the plurality of data blocks such as the blocks #1, #2, #3, etc. with a block link for indicating the respective access timings of the blocks #1, #2, #3, etc., to make the SPOR be performed according to the respective access timings of the blocks #1, #2, #3, etc., for guaranteeing the correctness of the SPOR. For better comprehension, the SPOR may comprise the following SPOR operations:

(1) rebuilding a physical-to-logical (P2L) address mapping table of a certain block to correctly record a set of logical addresses associated with a set of physical addresses of a set of physical pages of this block at a set of corresponding P2L table entries within the P2L address mapping table, for indicating a set of P2L mapping relationships from the set of physical addresses to the set of logical addresses; and (2) updating the L2P table LPT according to the P2L address mapping table to correctly record the set of physical addresses at a set of corresponding L2P table entries within the L2P table LPT, for indicating a set of L2P mapping relationships from the set of logical addresses to the set of physical addresses;

where any set of mapping relationships among these two sets of mapping relationships (i.e., the set of P2L mapping relationships from the set of physical addresses to the set of logical addresses and the set of L2P mapping relationships from the set of logical addresses to the set of physical addresses) can be regarded as a set of reverse mapping relationships of the other set of mapping relationships among these two sets of mapping relationships.

As the host device may send two or more write requests (e.g., the first write request and the second write request) for writing data at a same logical address, some of these two sets of mapping relationships may become out of date (and more particularly, incorrect) if this same logical address is one of the set of logical addresses. The memory controller 110 can use the link page LinkPG to record a series of block series numbers of the blocks #1, #2, #3, etc. to establish the block link for indicating the respective access timings of the blocks #1, #2, #3, etc., and can further use the L2P-mapping-existence information page MapInfoPG to record the record status (e.g., the L2P-mapping-existence information) of the block link, such as which block among the blocks #1, #2, #3, etc. in the block link is the last L2P-mapping-relationship-updated block whose L2P mapping relationships (e.g., the set of L2P mapping relationships) have been updated to the L2P table LPT, for indicating that the L2P mapping relationships of a series of consecutive L2P-mapping-relationship-updated blocks (e.g., from the first L2P-mapping-relationship-updated block such as the block #1 to the last L2P-mapping-relationship-updated block) in the block link have been updated to the L2P table LPT according to the respective access timings of the blocks #1, #2, #3, etc. (labeled "Mapping relationships exist in the L2P table" in FIG. 3 for brevity).

When the SPO event occurs during the GC procedure and it is needed to perform the SPOR, the memory device 100 can perform the SPOR operations on one or more SPOR-needed blocks (e.g., one or more open blocks) among the blocks #1, #2, #3, etc. in the block link according to the write protection information WP (e.g., the link page LinkPG and the L2P-mapping-existence information page MapInfoPG), and more particularly, perform the SPOR operations in the order of the respective access timings of the one or more SPOR-needed blocks, for guaranteeing the correctness of the SPOR. Therefore, the memory device 100 (e.g., the memory controller 110) that operates according to the method can consistently outperforms some of the best competitors.

Figure 4:
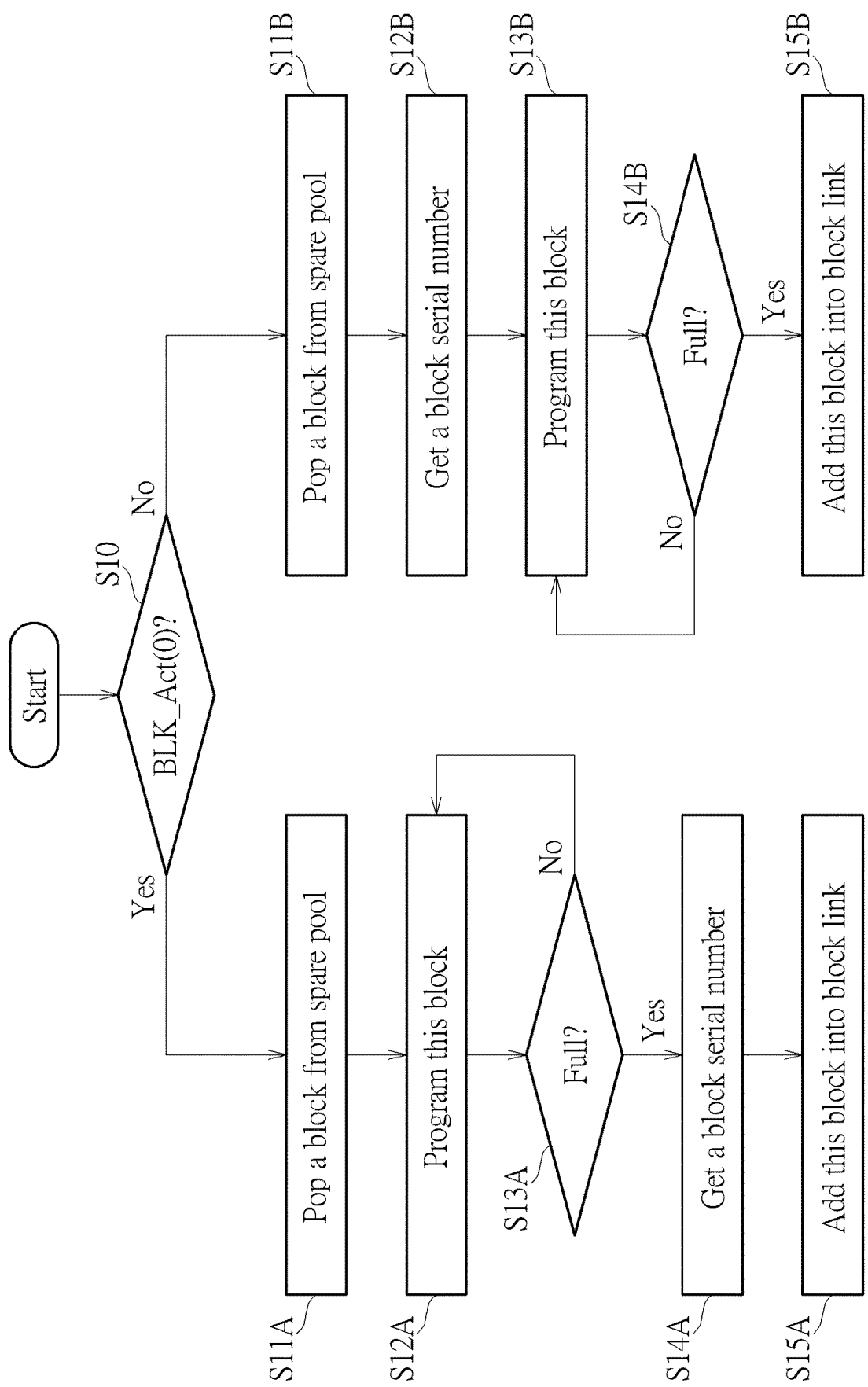
FIG. 4 is a diagram illustrating a serial number assignment control scheme of the method according to an embodiment of the instant application.

FIG. 4 is a diagram illustrating a serial number assignment control scheme of the method according to an embodiment of the instant application. For example, the memory controller 110 can manage the plurality of spare blocks with the spare pool SP as described above.

In Step S10, the memory controller 110 can determine whether a block being prepared for use is the host data block BLK_Act(0). If Yes (e.g., the block being prepared for use is the host data block BLK_Act(0)), Step S11A is entered; if No (e.g., the block being prepared for use is the GC destination block BLK_Act(1) rather than the host data block BLK_Act(0)), Step S11B is entered.

In Step S11A, the memory controller 110 can pop a block such as a first block from the spare pool SP to be the host data block BLK_Act(0).

In the partial working flow starting from Step S11A as shown in the left half of FIG. 4, the memory controller 110 can further perform a set of first subsequent operations on the host data block BLK_Act(0), where the host data block BLK_Act(0) can be arranged to receive data from the host device 50. More particularly, regarding the set of first subsequent operations, the serial number assignment of the host data block BLK_Act(0) may correspond to a timing (e.g., a first time point) of fully programing the host data block BLK_Act(0) since the first block is popped from the spare pool SP to be the host data block BLK_Act(0), for indicating a rank of the host data block BLK_Act(0) among the plurality of data blocks for further use in the POR. For example, the set of first subsequent operations may comprise the operations of Steps S12A, S13A, S14A and S15A.

In Step S12A, the memory controller 110 can program this block, i.e., the host data block BLK_Act(0) such as the first block.

In Step S13A, the memory controller 110 can determine whether the host data block BLK_Act(0) such as the first block is full. If Yes (e.g., the host data block BLK_Act(0) such as the first block is fully programed), Step S14A is entered; if No (e.g., the host data block BLK_Act(0) such as the first block has not been fully programed), Step S12A is entered.

In Step S14A, in response to the host data block BLK_Act(0) being full, the memory controller 110 can get a block serial number such as a first block serial number, and more particularly, assign the first block serial number as the serial number of the host data block BLK_Act(0) (e.g., the first block). More particularly, when writing (e.g., programing) End-of-Block (EoB) information into the host data block BLK_Act(0) (e.g., the first block) to close the host data block BLK_Act(0), the memory controller 110 can get the first block serial number and assign the first block serial number as the serial number of the host data block BLK_Act(0).

In Step S15A, the memory controller 110 can add this block, i.e., the host data block BLK_Act(0) such as the first block, into the block link. For example, the latest version of the block link may indicate the order of the plurality of data blocks.

In Step S11B, the memory controller 110 can pop a block such as a second block from the spare pool SP to be the GC destination block BLK_Act(1).

In the partial working flow starting from Step S11B as shown in the right half of FIG. 4, the memory controller 110 can further perform a set of second subsequent operations on the GC destination block BLK_Act(1), where the GC destination block BLK_Act(1) can be arranged to receive data from the GC source block during the GC procedure. More particularly, regarding the set of second subsequent operations, the serial number assignment of the GC destination block BLK_Act(1) may correspond to a timing (e.g., a second time point) of starting using the GC destination block BLK_Act(1) since the second block is popped from the spare pool SP to be the GC destination block BLK_Act(1), for indicating a rank of the GC destination block BLK_Act(1) among the plurality of data blocks for further use in the SPOR. For example, the set of second subsequent operations may comprise the operations of Steps S12B, S13B, S14B and S15B.

In Step S12B, the memory controller 110 can get a block serial number such as a second block serial number, and more particularly, assign the second block serial number as the serial number of the GC destination block BLK_Act(1) (e.g., the second block). More particularly, when having just opening the GC destination block BLK_Act(1) (e.g., the second block), the memory controller 110 can get the second block serial number and assign the second block serial number as the serial number of the GC destination block BLK_Act(1).

In Step S13B, the memory controller 110 can program this block, i.e., the GC destination block BLK_Act(1) such as the second block.

In Step S14B, the memory controller 110 can determine whether the GC destination block BLK_Act(1) such as the second block is full. If Yes (e.g., the GC destination block BLK_Act(1) such as the second block is fully programed), Step S15B is entered; if No (e.g., the GC destination block BLK_Act(1) such as the second block has not been fully programed), Step S13B is entered.

In Step S15B, in response to the GC destination block BLK_Act(1) being full, the memory controller 110 can add this block, i.e., the GC destination block BLK_Act(1) such as the second block, into the block link. More particularly, when the GC destination block BLK_Act(1) (e.g., the second block) is full, the memory controller 110 can write (e.g., program) the EoB information into the GC destination block BLK_Act(1) to close the GC destination block BLK_Act(1), and add the GC destination block BLK_Act(1) into the block link according to the block serial number of the GC destination block BLK_Act(1), for example, insert the GC destination block BLK_Act(1) into the correct block link location within the block link according to the block serial number of the GC destination block BLK_Act(1) among the block serial numbers of the other blocks in the block link. For example, the latest version of the block link may indicate the order of the plurality of data blocks.

According to this embodiment, the memory controller 110 can perform the serial number assignment of the host data block BLK_Act(0) and the serial number assignment of the GC destination block BLK_Act(1) in different manners regarding timing control, respectively. For example, the memory controller 110 can assign the first block serial number as the serial number of the host data block BLK_Act(0) (e.g., the first block) just after the occurrence of the host data block BLK_Act(0) being fully programed since the first block is popped from the spare pool SP to be the host data block BLK_Act(0), and therefore can make the serial number assignment of the host data block BLK_Act(0) be associated with the operation of closing the host data block BLK_Act(0) (e.g., the first block). For another example, the memory controller 110 can assign the second block serial number as the serial number of the GC destination block BLK_Act(1) (e.g., the second block) just after the second block is popped from the spare pool SP to be the GC destination block BLK_Act(1), and therefore can make the serial number assignment of the GC destination block BLK_Act(1) be associated with the operation of opening the GC destination block BLK_Act(1) (e.g., the second block).

For better comprehension, the method may be illustrated with the working flow shown in FIG. 4, but the present invention is not limited thereto. According to some embodiments, one or more steps may be added, deleted, or changed in the working flow shown in FIG. 4.

According to some embodiments, the memory controller 110 can use a tail serial number parameter TailSerial to record the latest assigned block serial number among a plurality of assigned block serial numbers, where the plurality of assigned block serial numbers may represent the block serial numbers (e.g., the first block serial number and the second block serial number) that have been assigned among all block serial numbers of a plurality of candidate block serial numbers. For example, at the beginning of the lifetime of the memory device 100 (e.g., before the user of the memory device 100 owns the memory device 100 and starts using the memory device 100), the memory controller 110 can set the tail serial number parameter TailSerial to be an initial value such as zero by default (e.g., TailSerial=0), and update the tail serial number parameter TailSerial when assigning a block serial number to be the serial number of any block of the plurality of data blocks. For example, when assigning a block serial number (e.g., 1) to be the serial number of the block #1, the memory controller 110 can increase the tail serial number parameter TailSerial with a predetermined increment such as one to update the tail serial number parameter TailSerial to be a new value such as one (e.g., TailSerial=1); when assigning a block serial number (e.g., 2) to be the serial number of the block #2, the memory controller 110 can increase the tail serial number parameter TailSerial with the predetermined increment such as one to update the tail serial number parameter TailSerial to be a new value such as two (e.g., TailSerial=2); and the rest can be deduced by analogy. For brevity, similar descriptions for these embodiments are not repeated in detail here.

According to some embodiments, based on the serial number assignment timing control, the memory controller 110 can perform the SPOR at least according to the respective serial numbers of the host data block BLK_Act(0) (e.g., the first block) and the GC destination block BLK_Act(1) (e.g., the second block) to prevent occurrence of any erroneous operation during the SPOR. For example, when there is a need, the memory controller 110 may select the host data block BLK_Act(0) (e.g., the first block) as the GC source block of the GC procedure, and therefore the GC source block of the GC procedure may be equal to the host data block BLK_Act(0). In this situation, no erroneous operation will occur during the SPOR. For brevity, similar descriptions for these embodiments are not repeated in detail here.

Figure 5:
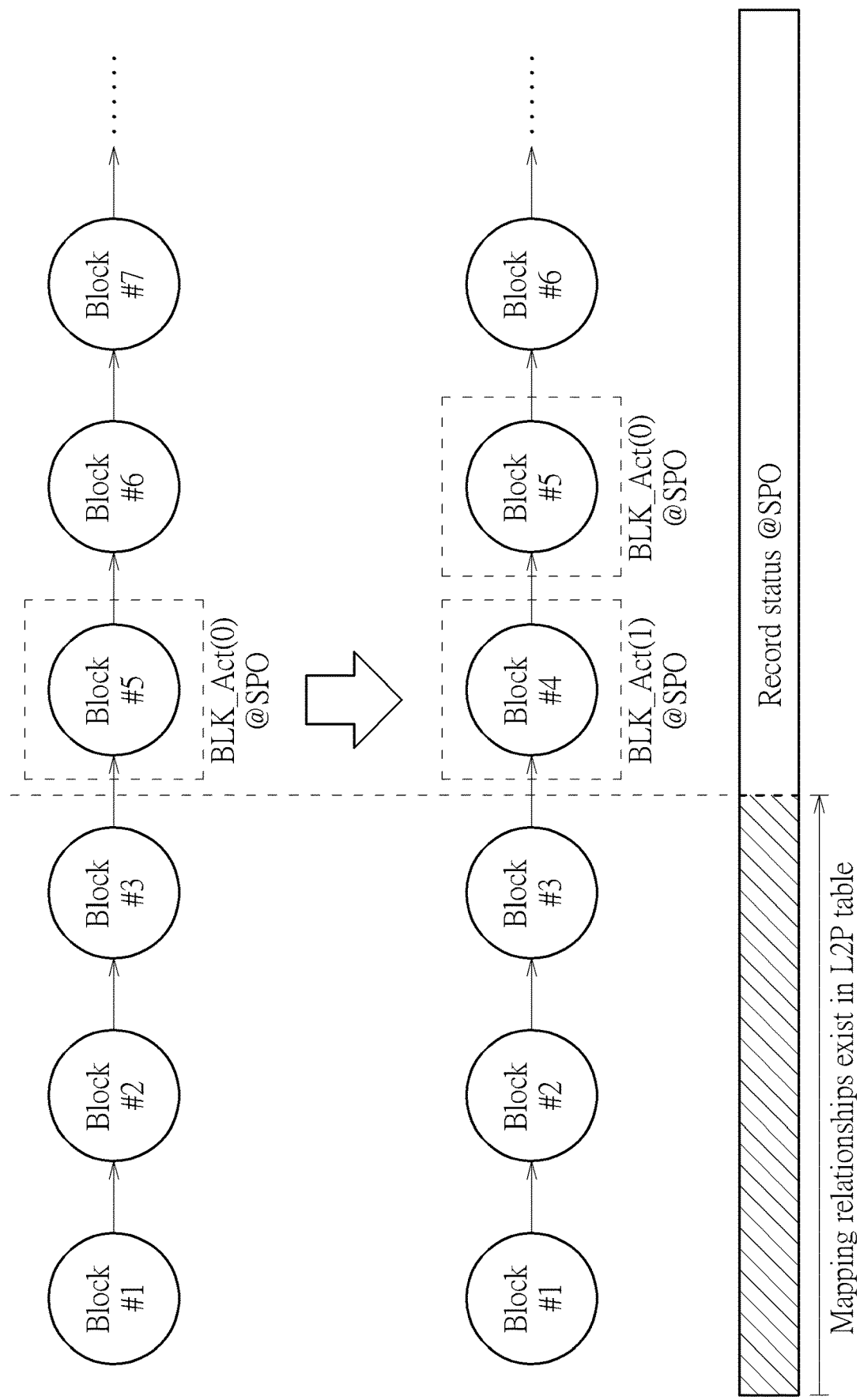
FIG. 5 illustrates, in the lower half thereof, a GC-timing-aware SPOR control scheme of the method according to an embodiment of the instant application, where another SPOR control scheme is illustrated in the upper half of FIG. 5 for better comprehension.

FIG. 5 illustrates, in the lower half thereof, a GC-timing-aware SPOR control scheme of the method according to an embodiment of the instant application, where another SPOR control scheme is illustrated in the upper half of FIG. 5 for better comprehension. The memory controller 110 that is operating according to the GC-timing-aware SPOR control scheme can be aware of the GC timing regarding the GC procedure, such as the timing (e.g., the second time point) of starting using the GC destination block BLK_Act(1) since the second block is popped from the spare pool SP to be the GC destination block BLK_Act(1), and therefore can properly maintain the block link to make all blocks within the block link be at correct locations, respectively, for example, in a situation where the SPO event occurs (labeled "@SPO" for brevity).

As shown in the upper half of FIG. 5, assuming that the memory device 100 (e.g., the memory controller 110) can be temporarily configured to operate according to the other SPOR control scheme, the serial number assignment of the GC destination block BLK_Act(1) may correspond to a timing (e.g., a third time point) of fully programing the GC destination block BLK_Act(1) since the second block is popped from the spare pool SP to be the GC destination block BLK_Act(1). For example, the SPO event may occur after the blocks #1, #2 and #3 have been fully programed and closed as indicated by the vertical dashed line passing through the partial block link between the blocks #3 and #5 in the block link shown in the upper half of FIG. 5. In addition, the link page LinkPG may have recorded the series of block series numbers of the blocks #1, #2, #3, etc. in the block link, and the L2P-mapping-existence information page MapInfoPG may have recorded the record status (e.g., the L2P-mapping-existence information) of the block link in the SPO event (labeled "Record status @SPO" for brevity), such as which block (e.g., the block #3) among the blocks #1, #2, #3, etc. in the block link is the last L2P-mapping-relationship-updated block whose L2P mapping relationships (e.g., the set of L2P mapping relationships) have been updated to the L2P table LPT, for indicating that the L2P mapping relationships of the series of consecutive L2P-mapping-relationship-updated blocks (e.g., from the first L2P-mapping-relationship-updated block such as the block #1 to the last L2P-mapping-relationship-updated block such as the block #3) in the block link shown in the upper half of FIG. 5 have been updated to the L2P table LPT according to the respective access timings of the blocks #1, #2, #3, etc. (labeled "Mapping relationships exist in the L2P table" in FIG. 5 for brevity). The serial number assignment of the GC destination block BLK_Act(1) in the other SPOR control scheme may cause the host data block BLK_Act(0) (e.g., the first block) in the SPO event (labeled "BLK_Act(0) @SPO" for brevity), such as the block #5, to immediately come after the block #3 in the block link. As a result, the SPOR operations may be performed erroneously due to an incorrect version of the block link.

As shown in the lower half of FIG. 5, in a situation where the memory device 100 (e.g., the memory controller 110) can be configured to operate according to the GC-timing-aware SPOR control scheme, the serial number assignment of the GC destination block BLK_Act(1) may correspond to the timing (e.g., the second time point) of starting using the GC destination block BLK_Act(1) since the second block is popped from the spare pool SP to be the GC destination block BLK_Act(1). For example, the SPO event may occur after the blocks #1, #2 and #3 have been fully programed and closed as indicated by the vertical dashed line passing through the partial block link between the blocks #3 and #5 in the block link shown in the lower half of FIG. 5. In addition, the link page LinkPG may have recorded the series of block series numbers of the blocks #1, #2, #3, etc. in the block link, and the L2P-mapping-existence information page MapInfoPG may have recorded the record status (e.g., the L2P-mapping-existence information) of the block link in the SPO event (labeled "Record status @SPO" for brevity), such as which block (e.g., the block #3) among the blocks #1, #2, #3, etc. in the block link is the last L2P-mapping-relationship-updated block whose L2P mapping relationships (e.g., the set of L2P mapping relationships) have been updated to the L2P table LPT, for indicating that the L2P mapping relationships of the series of consecutive L2P-mapping-relationship-updated blocks (e.g., from the first L2P-mapping-relationship-updated block such as the block #1 to the last L2P-mapping-relationship-updated block such as the block #3) in the block link shown in the lower half of FIG. 5 have been updated to the L2P table LPT according to the respective access timings of the blocks #1, #2, #3, etc. (labeled "Mapping relationships exist in the L2P table" in FIG. 5 for brevity). The serial number assignment of the GC destination block BLK_Act(1) in the GC-timing-aware SPOR control scheme may cause the GC destination block BLK_Act(1) (e.g., the second block) in the SPO event (labeled "BLK_Act(1) @SPO" for brevity), such as the block #4, to immediately come after the block #3 in the block link, and further cause the host data block BLK_Act(0) (e.g., the first block) in the SPO event (labeled "BLK_Act(0) @SPO" for brevity), such as the block #5, to immediately come after the block #4 in the block link. As a result, the SPOR operations may be performed correctly according to a correct version of the block link.

As the serial number assignment of the GC destination block BLK_Act(1) may correspond to the timing (e.g., the second time point) of starting using the GC destination block BLK_Act(1) since the second block is popped from the spare pool SP to be the GC destination block BLK_Act(1), the memory controller 110 that is operating according to the GC-timing-aware SPOR control scheme can properly maintain the block link according to the rank of the GC destination block BLK_Act(1) among the plurality of data blocks for further use in the SPOR. For brevity, similar descriptions for this embodiment are not repeated in detail here.

For better comprehension, the blocks #1, #2, #3, #5, #6, #7, etc. may be illustrated in the block link shown in the upper half of FIG. 5 to indicate the order of the blocks #1, #2, #3 and #5 as an example and further indicate a possible trend of the subsequent blocks such as the blocks #6, #7, etc., and the blocks #1, #2, #3, #4, #5, #6, etc. may be illustrated in the block link shown in the lower half of FIG. 5 to indicate the order of the blocks #1, #2, #3, #4 and #5 as an example and further indicate a possible trend of the subsequent blocks such as the blocks #6, etc., but the present invention is not limited thereto. According to some embodiments, the blocks in the block link may vary.

According to some embodiments, at the moment when the SPO event occurs, the write protection information WP (e.g., the link page LinkPG and the L2P-mapping-existence information page MapInfoPG) may be incomplete, and more particularly, may have not been completely stored or updated in time, and therefore may become unreliable. In this situation, the memory controller 110 may scan the whole of the plurality of data blocks to rebuild the write protection information WP for determining the latest version (e.g., the correct version) of the block link. For brevity, similar descriptions for these embodiments are not repeated in detail here.

Figure 6:
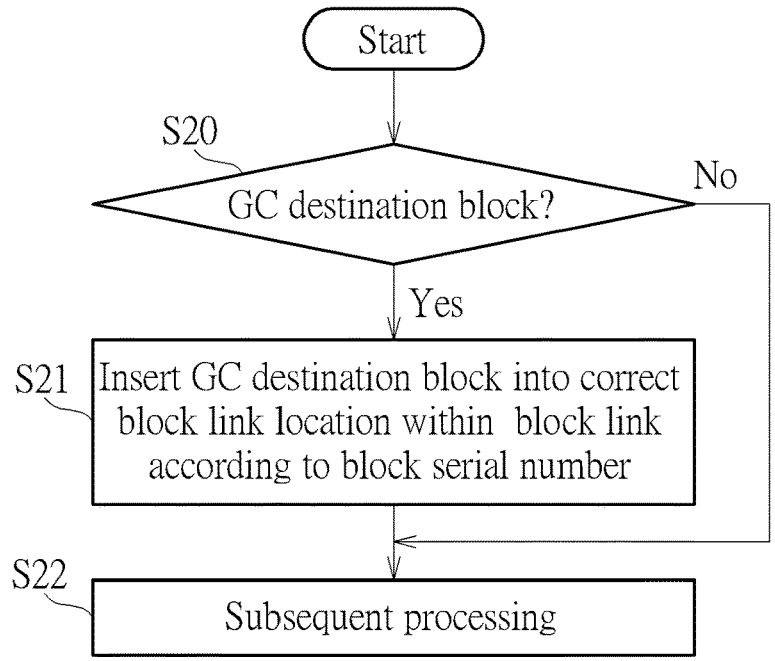
FIG. 6 is a diagram illustrating a block link correction control scheme of the method according to an embodiment of the instant application.

FIG. 6 is a diagram illustrating a block link correction control scheme of the method according to an embodiment of the instant application.

In Step S20, the memory controller 110 can determine whether the block being prepared for use is the GC destination block BLK_Act(1). If Yes (e.g., the block being prepared for use is the GC destination block BLK_Act(1)), Step S21 is entered; if No (e.g., the block being prepared for use is the host data block BLK_Act(0)), Step S22 is entered.

In Step S21, the memory controller 110 can insert the GC destination block BLK_Act(1) into the correct block link location within the block link according to the block serial number of the GC destination block BLK_Act(1) among the block serial numbers of the other blocks in the block link.

In Step S22, the memory controller 110 can perform subsequent processing. For example, in a situation where the SPO event occurs, the memory controller 110 can perform the subsequent processing such as the SPOR operations.

For better comprehension, the method may be illustrated with the working flow shown in FIG. 6, but the present invention is not limited thereto. According to some embodiments, one or more steps may be added, deleted, or changed in the working flow shown in FIG. 6.

According to some embodiments, the memory controller 110 can perform the SPOR operations on the block #i, where the block index i can be a positive integer, but the present invention is not limited thereto. According to some embodiments, the memory controller 110 can determine whether to perform the SPOR operations on the block #i first. For example, if it is determined to the SPOR operations on the block #i, the memory controller 110 performs the SPOR operations on the block #i; otherwise, the memory controller 110 skips the block #i and prevents performing the SPOR operations on the block #i. For brevity, similar descriptions for these embodiments are not repeated in detail here.

Figure 7:
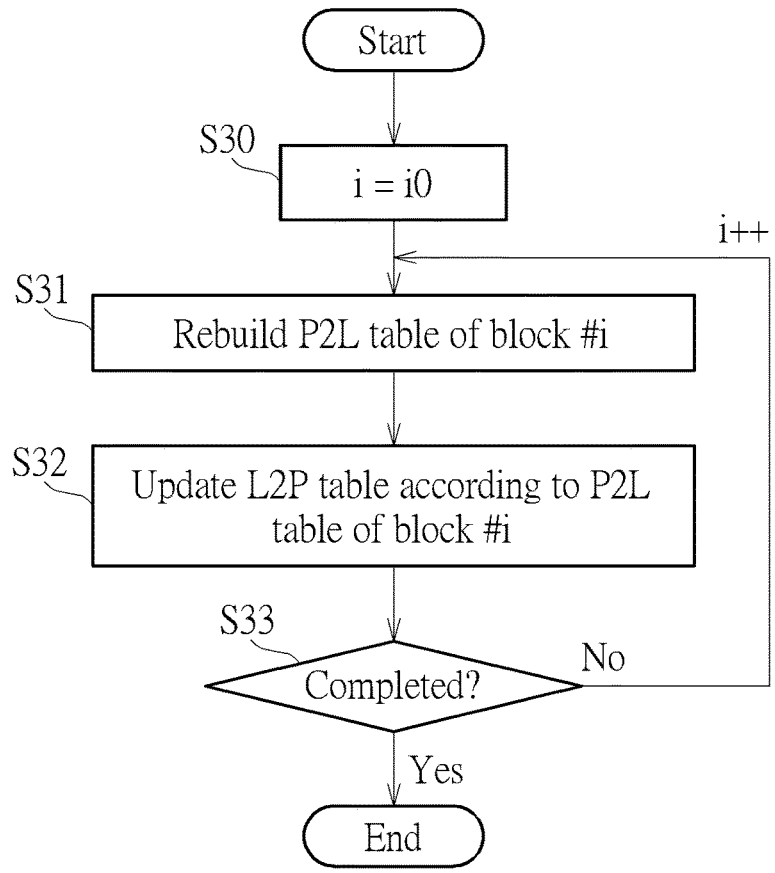
FIG. 7 is a diagram illustrating a mapping table rebuilding control scheme of the method according to an embodiment of the instant application.

FIG. 7 is a diagram illustrating a mapping table rebuilding control scheme of the method according to an embodiment of the instant application.

In Step S30, the memory controller 110 can set the block index i to be an initial value i0 of the block index i (labeled "i=i0" for brevity). For example, the initial value i0 may indicate the block #i0 that the memory controller 110 should process first during the SPOR, where the memory controller 110 may determine the initial value i0 according to the write protection information WP (e.g., the link page LinkPG and the L2P-mapping-existence information page MapInfoPG), but the present invention is not limited thereto. According to some embodiments, the memory controller 110 may determine the initial value i0 according to other information.

In Step S31, the memory controller 110 can rebuild a P2L table (e.g., the P2L address mapping table) of the block #i, and more particularly, rebuild the P2L address mapping table of the block #i to correctly record a set of logical addresses associated with a set of physical addresses of a set of physical pages of the block #i at a set of corresponding P2L table entries within the P2L address mapping table of the block #i, for indicating a set of P2L mapping relationships from this set of physical addresses to this set of logical addresses.

In Step S32, the memory controller 110 can update the L2P table LPT according to the P2L table of the block #i, and more particularly, update the L2P table LPT according to the P2L address mapping table of the block #i to correctly record this set of physical addresses (of the set of physical pages of the block #i) at a set of corresponding L2P table entries within the L2P table LPT, for indicating a set of L2P mapping relationships from this set of logical addresses to this set of physical addresses.

In Step S33, according to whether at least one predetermine condition (e.g., one or more predetermine conditions) is satisfied, the memory controller 110 can determine whether the SPOR is completed. If Yes (e.g., the aforementioned at least one predetermine condition is satisfied), the working flow shown in FIG. 7 comes to the end; if No (e.g., the aforementioned at least one predetermine condition is not satisfied), Step S31 is entered to process the next block, where the memory controller 110 can increase the block index i with a predetermined increment such as one (labeled "i++" for brevity).

For better comprehension, the method may be illustrated with the working flow shown in FIG. 7, but the present invention is not limited thereto. According to some embodiments, one or more steps may be added, deleted, or changed in the working flow shown in FIG. 7.

According to some embodiments, the aforementioned at least one predetermine condition may comprise:
(1) there is no full data block that needs to be processed in the SPOR; and
(2) there is no open block;
but the present invention is not limited thereto. According to some embodiments, the aforementioned at least one predetermine condition may vary.

According to some embodiments, the memory controller 110 can operate according to two or more control schemes among the above control schemes of the method. For brevity, similar descriptions for these embodiments are not repeated in detail here.

Figure 8A:
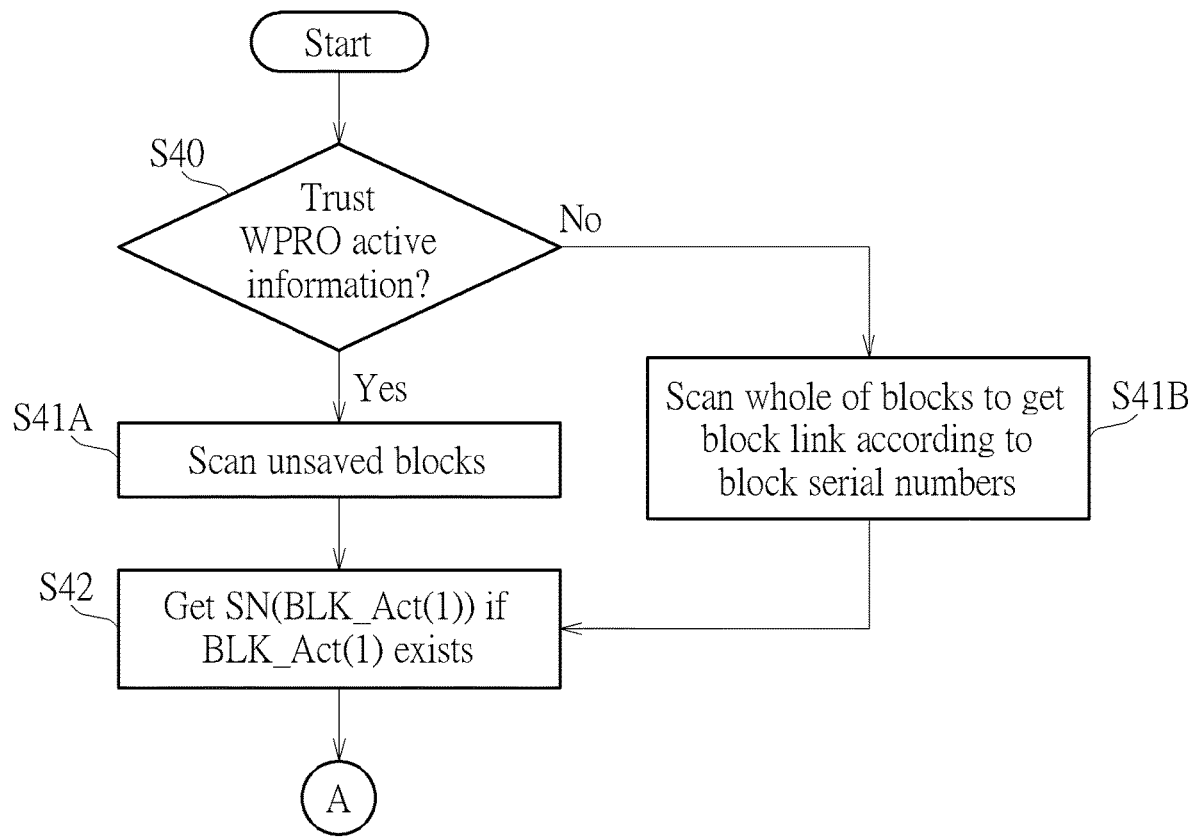
FIG. 8A illustrates a first portion of a working flow of the method according to an embodiment of the present invention.
Figure 8B:
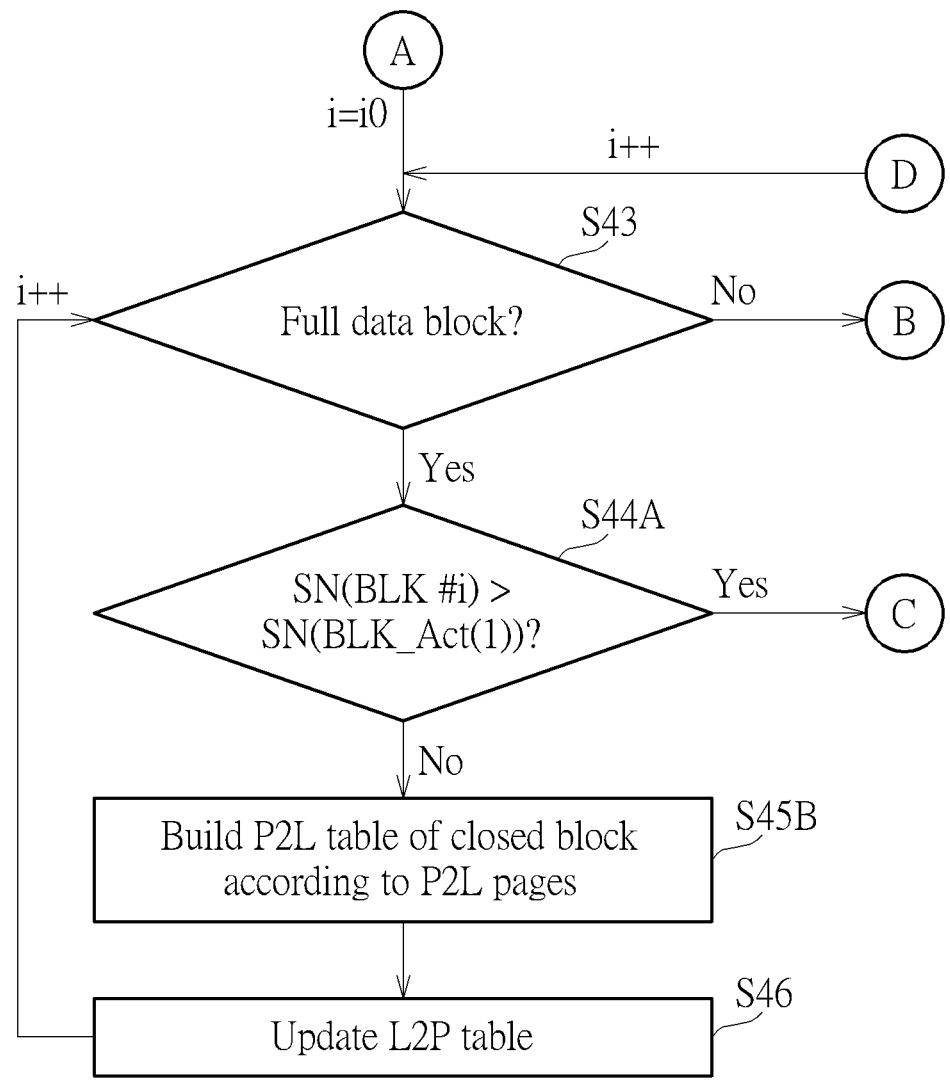
FIG. 8B illustrates a second portion of the working flow of the method according to the embodiment shown in FIG. 8A.
Figure 8C:
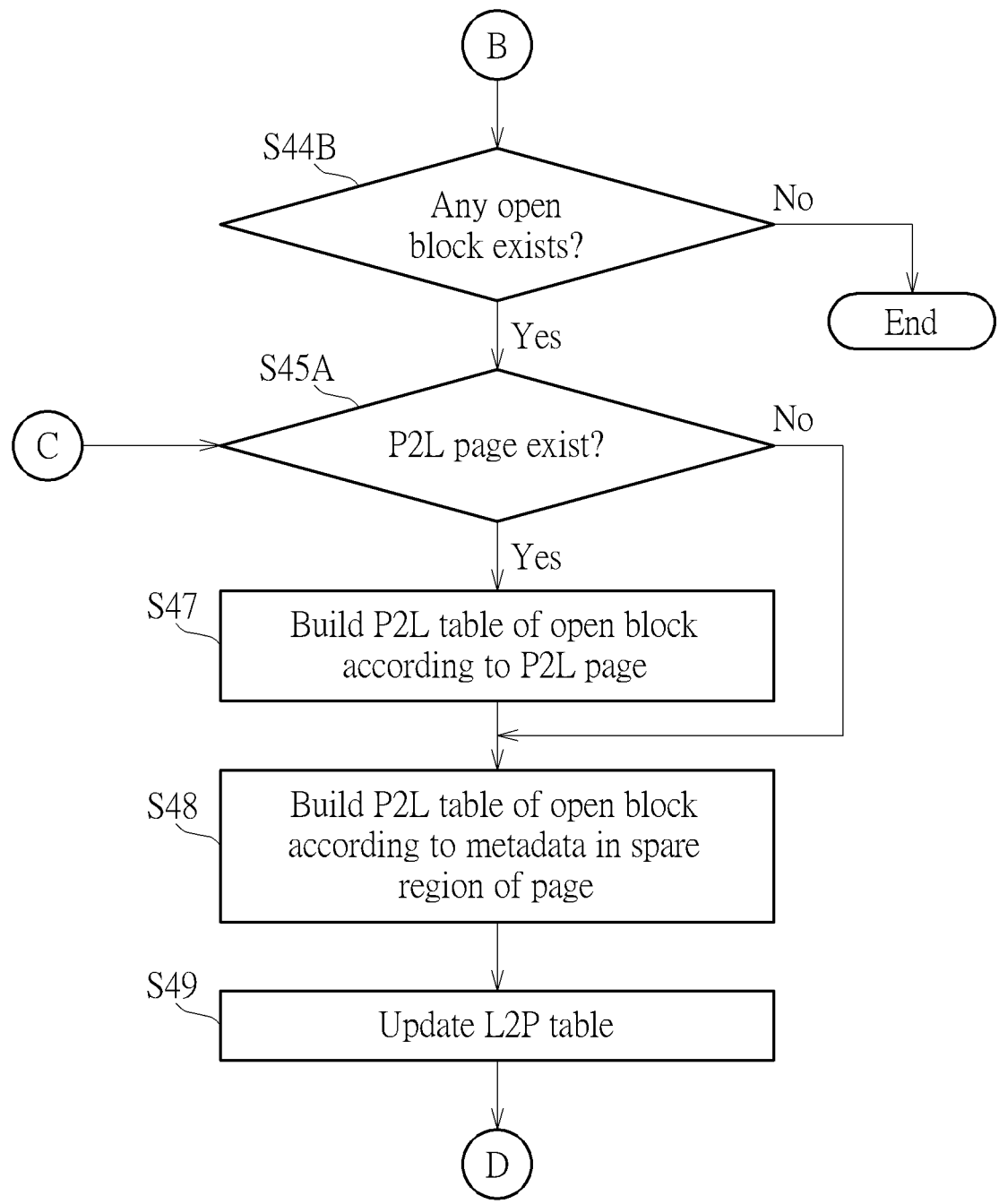
FIG. 8C illustrates a third portion of the working flow of the method according to the embodiment shown in FIG. 8A.

FIG. 8A, FIG. 8B and FIG. 8C respectively illustrate a first portion, a second portion and a third portion of a working flow of the method according to an embodiment of the present invention, where the second portion (e.g., Steps S43, S44A, S45B and S46) shown in FIG. 8B can be connected to the first portion (e.g., Steps S40, S41A, S41B and S42) shown in FIG. 8A through the node A, and the third portion (e.g., Steps S44B, S45A, S47, S48 and S49) shown in FIG. 8C can be connected to the second portion shown in FIG. 8B through the nodes B, C and D. For example, the memory controller 110 can be configured to operate according to the majority of control schemes among the above control schemes of the method (except the other SPOR control scheme), but the present invention is not limited thereto.

In Step S40, the memory controller 110 can determine whether to trust the write protection (WPRO) information WP (e.g., the link page LinkPG and the L2P-mapping-existence information page MapInfoPG) for indicating the status of one or more active blocks in the block link (labeled "WPRO active information" for brevity). If Yes, Step S41A is entered; if No, Step S41B is entered.

In Step S41A, the memory controller 110 can scan unsaved blocks (e.g., the blocks that have not been saved with the SPOR, such as the blocks that need to be processed with the SPOR operations) according to write protection information WP.

In Step S41B, the memory controller 110 can scan the whole of the plurality of data blocks to get the block link according to the block serial numbers the plurality of data blocks, and more particularly, can update the write protection information WP (e.g., the link page LinkPG and the L2P-mapping-existence information page MapInfoPG) to indicate the block link and the record status thereof.

In Step S42, the memory controller 110 can get the serial number of the GC destination block BLK_Act(1) (e.g., the second block) if the GC destination block BLK_Act(1) exists (labeled "SN(BLK_Act(1)) if BLK_Act(1) exists" for brevity). Afterward, Step S43 shown in FIG. 8B is entered through the node A, where the memory controller 110 can set the block index i to be the initial value i0 of the block index i (labeled "i=i0" for brevity). For example, the initial value i0 may indicate the block #i0 that the memory controller 110 should process first during the SPOR, and the memory controller 110 may determine the initial value i0 according to the write protection information WP (e.g., the link page LinkPG and the L2P-mapping-existence information page MapInfoPG).

In Step S43, the memory controller 110 can determine whether any full data block exists, and more particularly, determine whether the block #i is a full data block. If Yes (e.g., the block #i is a full data block), Step S44A is entered; if No (e.g., the block #i is not a full data block), Step S44B shown in FIG. 8C is entered through the node B. For example, the full data block may represent a data block that is fully programed among the plurality of data blocks.

In Step S44A, the memory controller 110 can determine whether the serial number of the block #i is greater than the serial number of the GC destination block BLK_Act(1) (labeled "SN(BLK #i)>SN(BLK_Act(1))" for brevity). If Yes, Step S45A shown in FIG. 8C is entered through the node C; if No, Step S45B is entered as shown in FIG. 8B.

In Step S45B, the memory controller 110 can build the P2L table (e.g., the P2L address mapping table) of a closed block (e.g., the block #i that is determined to be the full data block in Step S43) according to the P2L pages in the closed block, where the P2L pages may store a set of P2L mapping relationships (e.g., the set of P2L mapping relationships mentioned above) of the closed block.

In Step S46, the memory controller 110 can updating the L2P table LPT according to the P2L table of the closed block (e.g., the block #i that is determined to be the full data block in Step S43). Afterward, Step S43 is entered, where the memory controller 110 can increase the block index i with the predetermined increment such as one (labeled "i++" for brevity).

In Step S44B shown in FIG. 8C, the memory controller 110 can determine whether any open block exists, and more particularly, determine whether the block #i is an open block. If Yes (e.g., the block #i is an open block), Step S45A is entered; if No (e.g., the block #i is not an open data block), the working flow shown in IG. 8A, FIG. 8B and FIG. 8C comes to the end.

In Step S45A, the memory controller 110 can determine whether one or more P2L pages exist in the open block (e.g., the block #i that is determined to be the open block in Step S44B). If Yes, Step S47 is entered; if No, Step S48 is entered. For example, the memory controller 110 may have determined a set of P2L mapping relationships of a set of programed pages in the open block according to the metadata in the spare regions of the set of programed pages, respectively, and may have collected and recorded the set of P2L mapping relationships into the one or more P2L pages for accelerating the progress of building the P2L table (e.g., the P2L address mapping table) of the open block, where the metadata in the spare regions of the set of programed pages may indicate the set of P2L mapping relationships, respectively, but the present invention is not limited thereto.

In Step S47, the memory controller 110 can build the P2L table of the open block (e.g., the block #i that is determined to be the open block in Step S44B) according to the one or more P2L pages, and more particularly, obtain the set of P2L mapping relationships from the one or more P2L pages and record a set of P2L entries respectively indicating the set of P2L mapping relationships into the P2L table of the open block.

In Step S48, the memory controller 110 can build the P2L table of the open block (e.g., the block #i that is determined to be the open block in Step S44B) according to the metadata in the respective spare regions of at least one portion (e.g., a portion or all) of multiple programed pages of the open block. For example, in a situation where the determination result of Step S45A is "Yes" (i.e., Step S48 is executed after Step S47 is executed), the memory controller 110 can obtain additional P2L mapping relationships from additional programed pages among the multiple programed pages (e.g., the remaining programed pages among the multiple programed pages, except the set of programed pages) of the open block and record additional P2L entries respectively indicating the additional P2L mapping relationships into the P2L table. For another example, in a situation where the determination result of Step S45A is "No" (i.e., Step S48 is executed after Step S45A is executed, and Step S47 is skipped), the memory controller 110 can obtain multiple P2L mapping relationships from the multiple programed pages of the open block and record multiple P2L entries respectively indicating the multiple P2L mapping relationships into the P2L table.

In Step S49, the memory controller 110 can updating the L2P table LPT according to the P2L table of the open block (e.g., the block #i that is determined to be the open block in Step S44B). Afterward, Step S43 shown in FIG. 8B is entered through the node D, where the memory controller 110 can increase the block index i with the predetermined increment such as one (labeled "i++" for brevity).

According to this embodiment, if the GC destination block BLK_Act(1) exists, the memory controller 110 can obtain the correct version of the block link by executing Step S42. When it is the turn of the GC destination block BLK_Act(1) in the loop of the second portion (e.g., Steps S43, S44A, S45B and S46) shown in FIG. 8B, the memory controller 110 can obtain the determination result "Yes" in Step S44A according to the correct version of the block link (e.g., Step S45A is entered through the node C), and process the GC destination block BLK_Act(1) with the SPOR operations in the partial working flow comprising Steps S45A, S47, S48 and S49 shown in FIG. 8C.

For better comprehension, the method may be illustrated with the working flow shown in FIGS. 8A, 8B and 8C, but the present invention is not limited thereto. According to some embodiments, one or more steps may be added, deleted, or changed in the working flow shown in FIGS. 8A, 8B and 8C.

According to some embodiments, when opening the GC destination block BLK_Act(1) (e.g., the second block), the memory controller 110 can get the second block serial number and assign the second block serial number as the serial number of the GC destination block BLK_Act(1), and further record the serial number of the host data block BLK_Act(0) (e.g., the first block) of this moment, such as the first block serial number mentioned above. More particularly, when writing (e.g., programing) data into a data region in any page (e.g., each page) of the GC destination block BLK_Act(1), the memory controller 110 can write (e.g., program) the serial number of the host data block BLK_Act(0) (e.g., the first block) of this moment, such as the first block serial number mentioned above, into a spare region in the any page of the GC destination block BLK_Act (1) to be partial metadata (e.g., a portion of the metadata) of the any page, where the memory controller 110 can use a partial spare region (e.g., having a predetermined size such as one or more bytes) of the spare region in the any page to store the serial number of the host data block BLK_Act(0) (e.g., the first block), but the present invention is not limited thereto. In addition, the host data block BLK_Act(0) such as the first block may become full (e.g., fully programed) before the GC destination block BLK_Act(1) such as the second block becomes full (e.g., fully programed). In this situation, the memory controller 110 can write (e.g., program) the EoB information into the first block to close the first block, and pop another block such as a third block from the spare pool SP to be the latest host data block BLK_Act (0), having no need to replace the serial number (e.g., the first block serial number of the first block) to be written (e.g., programed) into the spare region in the any page of the GC destination block BLK_Act(1). As a result, the memory controller 110 that is operating according to the GC-timing-aware SPOR control scheme shown in the lower half of FIG. 5 can be aware of this situation, and therefore can properly maintain the block link to make all blocks within the block link be at their correct locations, respectively.

Taking the block link shown in the lower half of FIG. 5 as an example, the memory controller 110 may have written (e.g., programed) the serial number of the host data block BLK_Act(0) corresponding to the SPO event (labeled "BLK_Act(0) @SPO" in FIG. 5 for brevity), such as the block serial number "5" of the block #5, into the spare region in any page (e.g., each page) among one or more programed pages of the GC destination block BLK_Act(1) (e.g., the block #4) corresponding to the SPO event (labeled "BLK_Act(1) @SPO" in FIG. 5 for brevity) to be partial metadata (e.g., a portion of the metadata) of the any page before the occurrence of the SPO event. During the SPOR, the memory controller 110 can determine whether a target block to be processed with the SPOR operations is an awaiting block (e.g., the block #5) indicated by the block serial number (e.g., 5) recorded in the spare region in the any page among the one or more programed pages of the GC destination block BLK_Act(1) (e.g., the block #4) corresponding to the SPO event. If the target block to be processed with the SPOR operations is the awaiting block (e.g., the block #5), the memory controller 110 can process the GC destination block BLK_Act(1) (e.g., the block #4) corresponding to the SPO event with the SPOR operations first, and then process one or more subsequent blocks starting from the awaiting block (e.g., the block #5). For brevity, similar descriptions for these embodiments are not repeated in detail here.

According to some embodiments, when writing (e.g., programing) data into the data region in the any page (e.g., each page) of the GC destination block BLK_Act(1), the memory controller 110 can write (e.g., program) the serial number of the host data block BLK_Act(0) (e.g., the first block) of this moment, such as the first block serial number mentioned above, into the spare region in the any page of the GC destination block BLK_Act(1) (e.g., the second block) to be the partial metadata of the any page. In addition, before the GC destination block BLK_Act(1) (e.g., the second block) is closed, the memory controller 110 can prevent the host data block BLK_Act(0) (e.g., the first block) from being used as the GC source block of the GC procedure, but the present invention is not limited thereto. For brevity, similar descriptions for these embodiments are not repeated in detail here.

According to some embodiments, when writing (e.g., programing) data into the data region in the any page (e.g., each page) of the GC destination block BLK_Act(1), the memory controller 110 can write (e.g., program) the serial number of the host data block BLK_Act(0) (e.g., the first block) of this moment, such as the first block serial number mentioned above, into the spare region in the any page of the GC destination block BLK_Act(1) (e.g., the second block) to be the partial metadata of the any page. In addition, before the GC destination block BLK_Act(1) (e.g., the second block) is closed, the memory controller 110 can prevent the host data block BLK_Act(0) (e.g., the first block) from being removed. When the memory device 100 is powered up at any time point, the memory controller 110 can use the host data block BLK_Act(0) (e.g., the first block) as a start point for referencing it, but the present invention is not limited thereto. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device with aid of serial number assignment timing control, the method being applied to a controller of the memory device, the memory device comprising the controller and a non-volatile (NV) memory, the NV memory comprising at least one NV memory element, the at least one NV memory element comprising a plurality of blocks, the method comprising:
    managing a plurality of spare blocks with a spare pool, wherein the plurality of blocks comprise the plurality of spare blocks;
    popping a first block from the spare pool to be a host data block, and performing a set of first subsequent operations on the host data block including assigning a serial number to the host data block, wherein the host data block is arranged to receive data from a host device, and serial number assignment of the host data block corresponds to a timing of fully programming the host data block since the first block is popped from the spare pool to be the host data block, and the serial number assigned to the host data block indicates a rank of the host data block among a plurality of data blocks for further use in sudden power off recovery (SPOR), wherein the plurality of blocks comprise the plurality of data blocks; and
    popping a second block from the spare pool to be a garbage collection (GC) destination block, and performing a set of second subsequent operations on the GC destination block including assigning a serial number to the GC destination block, wherein the GC destination block is arranged to receive data from a GC source block during a GC procedure, and serial number assignment of the GC destination block corresponds to a timing of starting using the GC destination block since the second block is popped from the spare pool to be the GC destination block, and the serial number assigned to the GC destination block indicates a rank of the GC destination block among the plurality of data blocks for further use in the SPOR.

2. The method of claim 1, wherein the set of first subsequent operations comprise:
    programming the host data block;
    determining whether the host data block is full;
    in response to the host data block being full, getting a first block serial number and assigning the first block serial number as a serial number of the host data block; and
    adding the host data block into a block link, wherein the block link indicates order of the plurality of data blocks.

3. The method of claim 1, wherein the set of second subsequent operations comprise:
    getting a second block serial number and assigning the second block serial number as a serial number of the GC destination block;
    programing the GC destination block;
    determining whether the GC destination block is full; and
    in response to the GC destination block being full, adding the GC destination block into a block link, wherein the block link indicates order of the plurality of data blocks.

4. The method of claim 1, wherein a first block serial number is assigned as a serial number of the host data block just after occurrence of the host data block being fully programed since the first block is popped from the spare pool to be the host data block, and a second block serial number is assigned as a serial number of the GC destination block just after the second block is popped from the spare pool to be the GC destination block.

5. The method of claim 1, further comprising:
    after a sudden power off (SPO) event, performing the SPOR at least according to respective serial numbers of the host data block and the GC destination block.

6. The method of claim 5, wherein the SPOR is performed at least according to the respective serial numbers of the host data block and the GC destination block to prevent occurrence of any erroneous operation during the SPOR.

7. The method of claim 1, wherein the host data block is selected as the GC source block of the GC procedure.

8. A memory device, comprising:
    a non-volatile (NV) memory, configured to store information, wherein the NV memory comprises at least one NV memory elements, and the at least one NV memory element comprises a plurality of blocks; and
    a controller, coupled to the NV memory, configured to control operations of the memory device, wherein the controller comprises:
        a processing circuit, configured to control the controller according to a plurality of host commands from a host device, to allow the host device to access the NV memory through the controller;
    wherein:
        the controller manages a plurality of spare blocks with a spare pool, wherein the plurality of blocks comprise the plurality of spare blocks;
        the controller pops a first block from the spare pool to be a host data block, and performs a set of first subsequent operations on the host data block including assigning a serial number to the host data block, wherein the host data block is arranged to receive data from the host device, and serial number assignment of the host data block corresponds to a timing of fully programming the host data block since the first block is popped from the spare pool to be the host data block, and the serial number assigned to the host data block indicates a rank of the host data block among a plurality of data blocks for further use in sudden power off recovery (SPOR), wherein the plurality of blocks comprise the plurality of data blocks; and
        the controller pops a second block from the spare pool to be a garbage collection (GC) destination block, and performs a set of second subsequent operations on the GC destination block including assigning a serial number to the GC destination block, wherein the GC destination block is arranged to receive data from a GC source block during a GC procedure, and serial number assignment of the GC destination block corresponds to a timing of starting using the GC destination block since the second block is popped from the spare pool to be the GC destination block, and the serial number assigned to the GC destination block indicates a rank of the GC destination block among the plurality of data blocks for further use in the SPOR.

9. An electronic device comprising the memory device of claim 8, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

10. A controller of a memory device, the memory device comprising the controller and a non-volatile (NV) memory, the NV memory comprising at least one NV memory element, the at least one NV memory element comprising a plurality of blocks, the controller comprising:
a processing circuit, configured to control the controller according to a plurality of host commands from a host device, to allow the host device to access the NV memory through the controller;
wherein:
the controller manages a plurality of spare blocks with a spare pool, wherein the plurality of blocks comprise the plurality of spare blocks;
the controller pops a first block from the spare pool to be a host data block, and performs a set of first subsequent operations on the host data block including assigning a serial number to the host data block, wherein the host data block is arranged to receive data from the host device, and serial number assignment of the host data block corresponds to a timing of fully programing the host data block since the first block is popped from the spare pool to be the host data block, and the serial number assigned to the host data block indicates a rank of the host data block among a plurality of data blocks for further use in sudden power off recovery (SPOR), wherein the plurality of blocks comprise the plurality of data blocks; and
the controller pops a second block from the spare pool to be a garbage collection (GC) destination block, and performs a set of second subsequent operations on the GC destination block including assigning a serial number to the GC destination block, wherein the GC destination block is arranged to receive data from a GC source block during a GC procedure, and serial number assignment of the GC destination block corresponds to a timing of starting using the GC destination block since the second block is popped from the spare pool to be the GC destination block, and the serial number assigned to the GC destination block indicates a rank of the GC destination block among the plurality of data blocks for further use in the SPOR.

\* \* \* \* \*